No. 79,317. PATENTED JUNE 30, 1868.
L. O. COLVIN.
COW MILKING MACHINE.
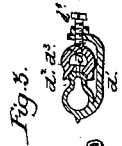
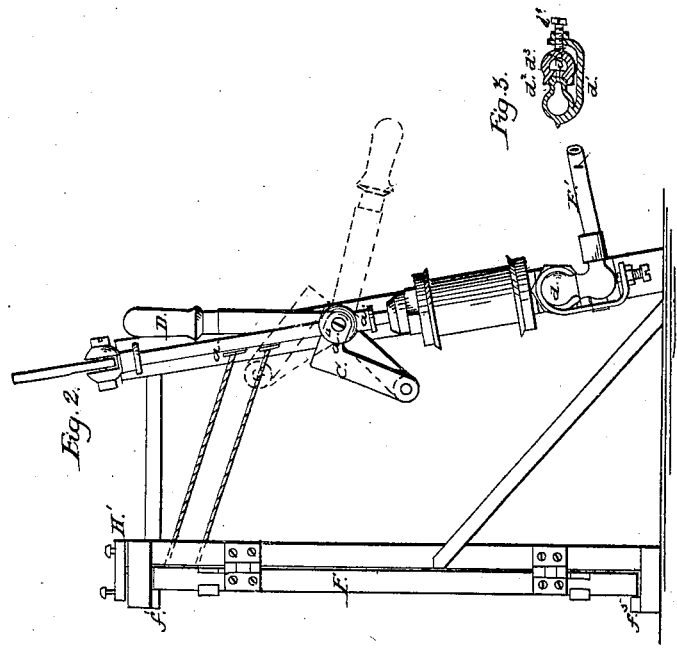
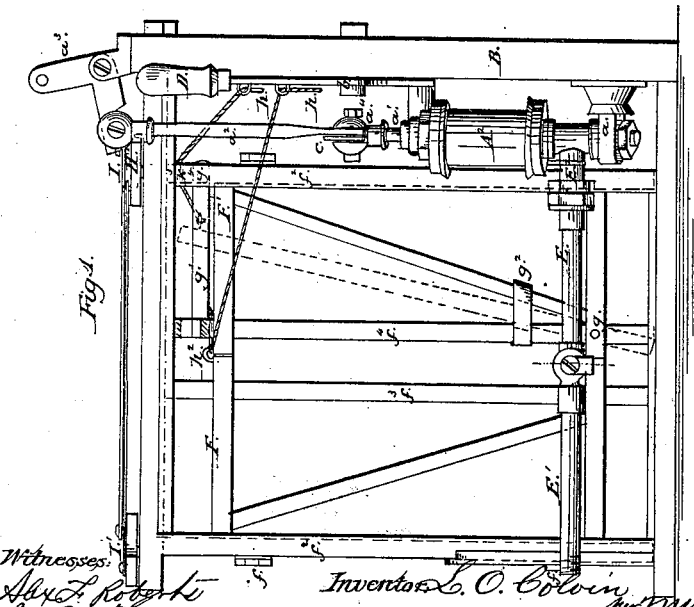

United States Patent Office.

L. O. COLVIN, OF NEW YORK, N. Y.

*Letters Patent No. 79,317, dated June 30, 1868.*

IMPROVED COW-MILKING MACHINE.

*The Schedule referred to in these Letters Patent and making part of the same.*

TO ALL WHOM IT MAY CONCERN:

Be it known that I, L. O. COLVIN, of New York, in the county of New York, and State of New York, have invented a new and useful Improvement in Cow-Milking Machines; and I do hereby declare that the following is a full, clear, and exact description thereof, which will enable others skilled in the art to make and use the same, reference being had to the accompanying drawings forming part of this specification, in which—

Figure 1 represents a front elevation of the machine, and the framing of the stall.

Figure 2, a side elevation of the same.

Figure 3, a detail view of a joint connection of the tubes in section.

Similar letters of reference indicate like parts.

The nature of my invention relates to improvements in machinery for milking cows, whereby it is designed to provide a simple, cheap, and effective apparatus for operating the milking-device, so arranged that the latter may be readily applied to the udder of the cows while standing in any position within the stall wherein the machine is arranged, and which may operate the milking-device in a manner to assimilate the action of a sucking calf, either when the cow gives down her milk freely, or when she refuses to give it freely, as is sometimes the case.

It is also designed to provide a ready means of opening and closing the passage from the stall where the machine is arranged, and where the cow is confined while being milked, so as to facilitate their ingress and egress without unnecessary loss of time, as will be more fully described.

A represents the cylinder of a pump, which is secured to the inclined post B of the framing by a projection from the lower end, which is jointed to an oscillating-bracket, $a$. The piston-rod $a^1$ is jointed to the part $a^4$ by a connection that will admit it to oscillate freely thereon, and the part $a^4$ is jointed to the connecting-rod $a^2$, by which it receives motion, and which is in turn jointed to the bell-crank lever $a^3$, which is connected to the prime mover in any suitable manner. The piston-rod $a$ is also jointed to the arm of a bent lever, C, which is pivoted to the bent hand-lever D, which latter is pivoted to the post B, as shown at $b$.

By this arrangement the axis of motion of the bent lever C may be adjusted above the horizontal plane of the fixed pivot $d$ of the hand-lever D, or below it, as desired; hence, as the end of the piston which is jointed to the lever C must, in its reciprocating movements, also describe the arc of a circle, of which the line, from its connection with the said lever to the axis of the latter, will be the radius, the pump-cylinder will be caused to oscillate on the bracket $a$.

If the hand-lever be moved so as to hold the axis of the lever C in a horizontal plane, which shall be in the centre, between the highest and the lowest positions of the pivot, by which the piston is jointed to the said arm $c$, in its upward and downward movements, then the arc of the circle described by the piston-head will deviate equally on each side of the vertical line drawn from the axis $a$ of oscillation of the cylinder and the joint, whereby the connecting-rod is jointed to the bell-crank $a^3$, and the oscillation of the cylinder will be but a slight amount. But if the said axis of the lever C be adjusted so as to stand below the aforementioned central point, then the deviation of the piston-joint will be greatest toward the axis of the arm $c$, and if it be depressed so low as to stand on a line perpendicular to the vertical line of the pump-cylinder and connecting-rod, which shall bisect the same at the position of the joint of the piston-rod with the arm $c$, when it stands at its lowest position, then the deflection of the same will be entirely toward the axis of the arm $c$, from the said vertical line of the pump, and in like manner, if the said axis of the arm $c$ be raised above the said central front, then the deflection of the joint of the piston and arm $c$ will be in the opposite direction, and in proportion as the said axis of the arm $c$ is moved in either direction from the said centre, the deflection of the cylinder or oscillation is increased.

In the description of this oscillating operation of the cylinder, I have referred to it as being connected to the framing in a vertical position, but in practice I prefer to give it a slight inclination, as shown in the drawings.

E represents a tube, which is jointed to a right-angled tubular projection, $E^2$, from the lower end of the pump-cylinder by a loose joint, which permits the tube E to be oscillated on its axis, and which has sufficient friction to hold it in any position that may be desired.

$E^1$ is also another short tube, which is jointed to the part E, so as to swing easily in a horizontal plane, or in inclined planes, according to the position in which the tube E may be adjusted on its axis.

$d$ represents a cap, screwed on to the end of the tube E, which is provided with a rounded projection, $d^2$, which fits into a socket in a cap, $d^3$, screwed on to end of tube $E^1$.

$a^1$ is a bracket, screwed to the cap $d$, and which supports a set-screw and pin-nut, $a^4$, whereby the cap $d^3$ is screwed up tightly to the projection of the cap $d$. An opening, $d^5$, is provided through the projection of the cap $d$, and the bottom of the socket in the cap $d^3$, whereby the communication of the bore of the tubes is secured.

The outer end of the tube $E^1$ is provided with the apparatus for applying to the cow's teats, to effect the milking operation, in combination with the parts herein described, but which is the subject of patents heretofore granted to the petitioner, and which is not, therefore, shown in this example.

The said apparatus consists mainly in a series of suction-pumps, that are applied to the teats, and which are operated by the action of India-rubber diaphragms, which are caused to vibrate by means of water contained in the pump $a$ and tubes E and $E^1$, which is caused to flow back and forth against the said diaphragm through the said tubes, by the action of the piston in the cylinder A, as will be readily understood.

If, when the said apparatus is applied to the cow's teats, she readily and freely gives her milk, then it is only required to adjust the hand-lever, so as to give to the pump-cylinder a slight oscillation, whereby the milking-apparatus on the end of the tube $E^1$ will have a slight rising and falling motion, similar to the action of the human hand in milking, or of a calf in sucking, it being understood that when the same is attached to the cow for milking, the tube E is turned from the position shown in fig. 1 to that shown in fig. 2, at or about right angles to the part E, whereby the oscillation of the cylinders gives to the part $E^1$ a swinging motion, in a vertical plane, up to the udder, and away from the same. But if, as is often the case, the cow does not give her milk freely, then, by a further adjustment of the hand-lever in the proper direction, the cylinder may be caused to oscillate so as to cause the said milking-apparatus to swing with such vigor as to strike more forcibly against the udder, similar to the well-known bunting action of the calf, until thereby she is induced to give her milk freely, when the operators, by a gentle movement of the hand-lever, may readjust the said axis of the lever C, so as to bring the oscillating action of the apparatus to a more easy and gentle action.

It will be observed that by reason of the friction-joint of the parts $E$ and $E^2$, the outer end of the pipe E may be adjusted to any required height for cows of different height, and it may also be turned bottom-side up when it is desired to clean the milking-apparatus. The cylinder A is also so jointed to the bracket $a$ that it may swing thereon, so that when a cow has been milked, the apparatus may swing around from under her to one side of the stall, to permit her to pass away, and another to take her place.

To facilitate the operation of placing the cows in the right position, and admitting them to pass away readily, I have provided, in connection with the milking-machine herein described, and composing a part of the whole apparatus, a stall provided with gates, to open for the passage away of the cows after milking, the said gates being also provided with stanchions, whereby the cow's head is readily secured while milking, one of which may be moved, to release the cow, and also to unlatch the gates, by means of a cord in the hands of the operators, and by means of another cord the said gates may be closed, and the next cow secured in the same manner.

F and F' represent gates, swinging on hinges, $f f$ and $f^1 f^1$, secured to the posts $f^2 f^2$ of the framing of the stall. The stanchion $f^3$ of the gate F is fixed rigidly to the same, but the stanchion $f^4$ is jointed to the lower arm of the gate F' at $g$, so as to oscillate on the same. $g^1$ is a catch, pivoted to the gate F' at $g^4$, the front end of which works in a slot in the upper end of the stanchion $f^4$, having a notch in the end, which locks the said stanchion in a vertical position. $g^2$ is a spring, which may be made of India rubber or any other material, and is fixed to the brace of the gate, and to the stanchion $f^4$, in a manner to swing it backward on the axis $g$, as shown in red in fig. 2.

$h$ is a cord, fastened at one end to the upper end of the stanchion $f^4$, and running through a guide-eye, $h^2$, and from thence to a guide-eye on the post B, where the other end is suspended in a position to be readily taken hold of by the operator when in his position near the pump. $h^1$ is another similar cord, fastened at one end to the latch $g^1$, and then passed through suitable guide-eyes to the same position near the pump, to be in like manner convenient to the operator.

When a cow passes into the stall, the pump and arms being swung around to one side out of the way, and the stanchion $f^4$ being in the position shown in red in fig. 1, she will pass her head through the space between the stanchions $f^3$ and $f^4$, when the operator, by means of the cord $h$, will swing the stanchion $f^4$ forward against the spring $g^2$, until the latch $g^1$ falls down and locks the said stanchion $f^4$ in a vertical position, the lower end of the stanchion swinging behind the end of a fixed catch, $f^5$, and the upper end behind a fixed catch, $f^6$, whereby the two gates are locked shut securely, whereby the cow will be secured.

The milking-apparatus on the end of the tube E may be swung around into position, and the cow may be milked by the same, as hereinbefore described. Having accomplished the same, the operator, by pulling on the cord $h^1$, will raise the latch and admit the stanchion $f^4$ to swing back by the action of the spring $g^2$, unlocking the gates, and by a continued pulling on the said cord $h^1$, the gate F' will be opened, and the swinging motion of the same will be communicated simultaneously to the gate F by means of the arms H and H', secured to the top of the main stanchions of the gates, and the cords or rods I and I', after which the cow will pass out through the gates, when, by gently pulling on the cord $h$, the gates will be brought to a closed position, but not locked, the stanchion $f^4$ remaining in position shown in red until another cow is driven into the stall, from the side opposite the gates, when a further pulling of the cord $h$ will swing the stanchion forward, locking in the neck of the cow between it and the stanchion $f^3$.

It is designed that the pump shall be arranged in the stall, in a position, relatively to the cow, about the middle of her length from head to tail, when standing in the required position of the stall.

It is also designed that the tube E shall reach to about the centre line under her, so that the tube E', being turned in the position to attach the milker, will run under her body towards her fore legs, to the point where it is joined to the tube E, whereby, no matter how much she may kick or swing around her hind parts, she cannot reach any part of the apparatus, nor detach it from her teats, as the tube $E^1$ will swing freely to accommodate itself to any position she may assume.

Having thus described my invention, I claim as new, and desire to secure by Letters Patent—

1. A pump-cylinder, for actuating a cow-milking apparatus, having a variable oscillating movement imparted to it, substantially as and for the purpose described.

2. The combination, with a pump having a variable oscillating movement, substantially as and for the purpose described, of the tubes E and $E^1$, for supporting the milker, and communicating the various motions to the same, as herein described and for the purpose set forth.

3. The combination of the tubes E and $E^1$ of the caps $d$ and $d^1$, bracket $a^1$, set-saw $d^4$, and pin-nut, when constructed and arranged substantially as and for the purpose described.

4. The combination, with a pump-piston rod, of the bent arm $e$, pivoted to the end of a bent hand-lever, D, and oscillating-joint $a$, substantially as and for the purpose described.

5. The stall, constructed as described, in combination with the cow-milking device, as herein set forth for the purpose specified.

6. The combination, with the oscillating-cylinder A, of the pipe E, when jointed to the same in the manner described, as and for the purpose described.

7. A pump-cylinder for cow-milking apparatus, to which the same is connected, as described, provided with a swivel-joint, $d$, whereby the cylinder may be susceptible of oscillation on its axis, substantially as and for the purpose described.

The above specification of my invention signed by me, this    day of March, 1868.

L. O. COLVIN.

Witnesses:
 WM. F. McNAMARA,
 ALEX. F. ROBERTS.